United States Patent Office 2,907,772
Patented Oct. 6, 1959

2,907,772

DERIVATIVES OF 1,1-BIS[4-OXO-5-HYDROXY-6-(4H-PYRANYL)] DIMETHYLAMINE

Carl Peter Krimmel, Mundelein, Ill., assignor to G. D. Searle & Co., Chicago, Ill., a corporation of Delaware No Drawing. Application October 2, 1957
Serial No. 687,608

7 Claims. (Cl. 260—345.9)

The present invention relates to derivatives of 1,1-bis[4-oxo-5-hydroxy-6-(4H-pyranyl)]dimethylamine and, more particularly, to the compounds of the general structural formula

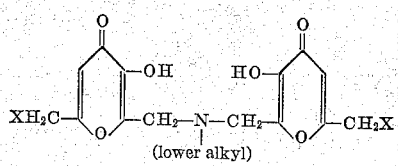
(lower alkyl)

wherein X is either a halogen or hydroxy group. In the above structural formula the lower alkyl group attached to the nitrogen atom can be a methyl, ethyl, straight-chain or branched propyl, butyl, amyl, hexyl, heptyl, or octyl group.

The compounds of this invention can be conveniently prepared by heating two molecular equivalents of a compound corresponding to the formula

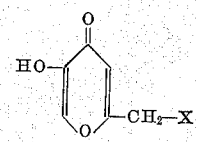

wherein X is defined as above, with two molecular equivalents of aqueous formaldehyde and one molecular equivalent of a mineral acid salt of the corresponding monoalkylamine. In this condensation, which is conveniently carried out in the presence of a slight excess of the mineral acid, the compound actually obtained is the mineral acid salt of the base illustrated hereinabove.

Upon neutralization of the initially-formed mineral acid salts, the free bases of this invention result.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. For purposes of this invention the free bases are equivalent to their non-toxic acid-addition salts.

The organic bases of this invention, being amphoteric agents, also form salts with a variety of other bases. Suitable for the formation of salts of this type are alkali metal hydroxides and alkaline earth metal hydroxides such as potassium hydroxide, sodium hydroxide and calcium hydroxide. For purposes of this invention the free bases are equivalent to such non-toxic salts formed by interaction of the enolic hydroxyl groups with a strong base.

The compounds of this invention have substantial solubility in water and possess valuable pharmacological properties. Thus they are inotropic agents, i.e. they increase cardiac output and contraction amplitude. These compounds also have a cortisone-like effect in inhibiting such inflammatory conditions as iritis.

The following examples are presented to illustrate this invention in further detail but the invention is not to be construed as limited in spirit or in scope by the details set forth therein. In these examples temperatures are given in degrees centigrade (°C.) and quantities of materials in parts by weight.

Example 1

A paste of 32.1 parts of 2-chloromethyl-5-hydroxy-4H-pyran-4-one, 6.8 parts of methylamine hydrochloride, 1.2 parts of concentrated hydrochloric acid and 17.0 parts of 36–38% formaldehyde is heated and slowly stirred on the steam bath for 15 minutes. To the reaction mixture, 10 parts of water are added and stirring and heating are continued for 3 hours. The dark red viscous solution is cooled to room temperature.

An initial separation of unreacted 2-chloro-methyl-5-hydroxy-4H-pyran-4-one usually takes place immediately after the above operation. In this case, the reaction mixture is suction filtered and a new crop of crystals is obtained from the mother liquor by allowing it to stand for 12 hours or by ice-cooling. This product is recrystallized by dissolving it in 55 parts of hot absolute ethanol, decolorizing with charcoal, seeding and very gradually diluting with 180 to 250 parts of anhydrous benzene. Seeding must be adequate and dilution gradual to avoid gum deposition. However, initial small deposits of gum may be separated by decantation of the supernatant liquid, reseeding and continuing the dilution with benzene. After a second recrystallization in the above-manner, 1,1-bis[2-chloromethyl-4-oxo-5-hydroxy-6-(4H-pyranyl)]trimethylamine hydrochloride is obtained as a water-soluble, cream-colored powder melting at about 158–160° C. with decomposition to a dark red frothy liquid. The compound gives a red-brown ferric chloride test.

Use of 8.2 parts of ethylamine hydrochloride instead of the methylamine hydrochloride used in the preceding reaction yields the hydrochloride of N-ethyl-1,1-bis[2-chloromethyl-4-oxo-5-hydroxy-6-(4H-pyranyl)]dimethylamine.

If, instead of 2-chloromethyl-5-hydroxy-4H-pyran-4-one, an equivalent amount of 2-bromomethyl-5-hydroxy-4H-pyran-4-one is substituted there is obtained the hydrochloride of 1,1-bis[2-bromomethyl-4-oxo-5-hydroxy-6-(4H-pyranyl)]trimethylamine.

Example 2

To 7.3 parts of n-butylamine are added, slowly and with stirring, 11 parts of 37–38% hydrochloric acid. Then 17.0 parts of 36–38% formaldehyde and 28.4 parts of kojic acid are added. The acidic reaction mixture which results is stirred and heated on the steam bath for 2 hours. It is evaporated to a viscous syrup on the steam bath. The syrup is diluted with 48 parts of anhydrous isopropanol, seeded and scratched, whereupon it gradually crystallizes to a thick slurry. The seeds are obtained by dissolving several drops of the syrup in absolute ethanol and diluting the ethanolic solution with benzene. The crystalline slurry is suction filtered, washed by suspension in 80 parts of anhydrous isopropanol and filtered. The filter cake is recrystallized from hot isopropanol and decolorizing carbon to yield white, water-soluble crystals melting at about 132–136° C. to a clear amber liquid. The compound gives a red ferric chloride test. The N-butyl-1,1-bis[2-hydroxymethyl-4-oxo-5-hydroxy-6-(4H-pyranyl)]dimethylamine thus obtained as a hydrochloride has the structural formula

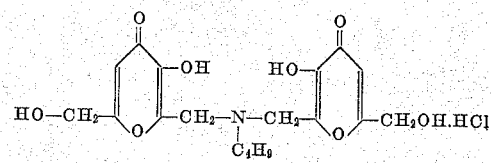

Example 3

A mixture of 28.4 parts of kojic acid, 13.5 parts of methylamine hydrochloride, 17.0 parts of 36–38% formaldehyde and 1.2 parts of concentrated hydrochloric acid is stirred and heated on the steam bath for 2.5 hours.

Crystallization of the reaction mixture is induced by mixing it with 80 parts of absolute ethanol and allowing it to stand in the refrigerator. Further dilution with absolute ethanol yields the remainder of the crystalline product.

The hydrochloride of 1,1-bis[2-hydroxymethyl-4-oxo-5-hydroxy-6-(4H-pyranyl)]trimethylamine is recrystallized by dissolving 5 parts of the compound in 3 parts of water, treating with decolorizing carbon, diluting with 40 parts of ethanol and seeding. After recrystallization this substance is a pale, orange-brown, water-soluble powder melting at about 171–175° C. with decomposition to a red-brown liquid. It gives a positive ferric chloride test.

The free base is obtained from this hydrochloride by the addition of an equivalent of alkali. Thus, the free base is released as a light orange gum or oil when 3.0 parts of the hydrochloride in 10 parts of water are treated with 0.5 part of potassium carbonate. Further addition of 1 part of potassium carbonate yields an aqueous solution of the dipotassium salt.

What is claimed is:

1. A compound of the structural formula

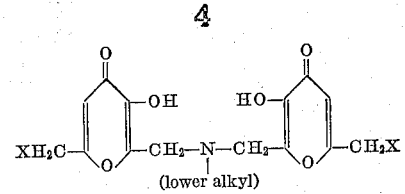

wherein X is a member of the class consisting of halogen and hydroxy groups.

2. N-(Lower alkyl)-1,1 - bis[2 - chloromethyl-4-oxo-5-hydroxy-6-(4H-pyranyl)]dimethylamine.

3. 1,1-Bis[2 - chloromethyl - 4 - oxo - 5 - hydroxy-6-(4H-pyranyl)]trimethylamine.

4. N-Ethyl-1,1-bis[2-chloromethyl-4-oxo - 5 - hydroxy-6-(4H-pyranyl)]dimethylamine.

5. N-(Lower alkyl)-1,1-bis[2-hydroxymethyl-4 - oxo-5-hydroxy-6-(4H-pyranyl)]dimethylamine.

6. 1,1-Bis[2-hydroxymethyl - 4 - oxo - 5 - hydroxy-6-(4H-pyranyl)]trimethylamine.

7. N-Butyl - 1,1 - bis[2 - hydroxymethyl - 4 - oxo - 5-hydroxy-6-(4H-pyranyl)]dimethylamine.

References Cited in the file of this patent

Spielman et al.: J. Am. Chem. Soc., vol. 69, pp. 2908 and 2909 (1947).

Woods: J. Am. Chem. Soc., vol. 68, p. 2744 (1946).

Elderfield: Heterocyclic Cmpds., vol. 1, pp. 386 and 387, Wiley (1950).

Adams et al.: Organic Reactions, p. 312, Wiley (1942).